(12) United States Patent
Morita et al.

(10) Patent No.: US 7,338,733 B2
(45) Date of Patent: Mar. 4, 2008

(54) BATTERY PACK

(75) Inventors: Hideyo Morita, Mihara-Gun (JP); Osamu Kaite, Tsuna-Gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 516 days.

(21) Appl. No.: 10/424,739

(22) Filed: Apr. 29, 2003

(65) Prior Publication Data

US 2004/0029000 A1    Feb. 12, 2004

(30) Foreign Application Priority Data

Apr. 30, 2002 (JP) .............................. 2002-129356
Oct. 30, 2002 (JP) .............................. 2002-316184
Apr. 23, 2003 (JP) .............................. 2003-118754

(51) Int. Cl.
*H01M 2/02* (2006.01)

(52) U.S. Cl. ..................... 429/162; 429/176; 429/178

(58) Field of Classification Search ..................... None
See application file for complete search history.

(56) References Cited

U.S. PATENT DOCUMENTS 6,218,041 B1 * 4/2001 Barbier et al. ................ 429/96
6,406,815 B1 * 6/2002 Sandberg et al. ...... 429/231.95
6,844,105 B1 * 1/2005 Hanafusa et al. ............. 429/62

FOREIGN PATENT DOCUMENTS

| JP | 1-145052    | 10/1989  |
| JP | 2000-315483 | 11/2000  |
| JP | 2000-340194 | 12/2000  |
| JP | 2001-57190  | 2/2001   |
| JP | 3077962     | 6/2001   |
| JP | 02-117819   | * 4/2002 |
| JP | 02-124235   | * 4/2002 |
| JP | 2002-117819 | 4/2002   |
| JP | 2002-124235 | 4/2002   |

* cited by examiner

*Primary Examiner*—John S. Maples
(74) *Attorney, Agent, or Firm*—Wenderoth, Lind & Ponack, L.L.P.

(57) ABSTRACT

A battery pack including a thin outline battery in an external case. The external case is provided with openings exposing the front and back of the thin outline battery to the outside, and is formed in the shape of a rectangular frame which covers both sides and both ends of the thin outline battery. The thickness of the external case is essentially equal to the thickness of the thin outline battery, or the external case is made thinner than the thin outline battery.

19 Claims, 24 Drawing Sheets

Exhibit II
(A) INVENTION (FIG2)
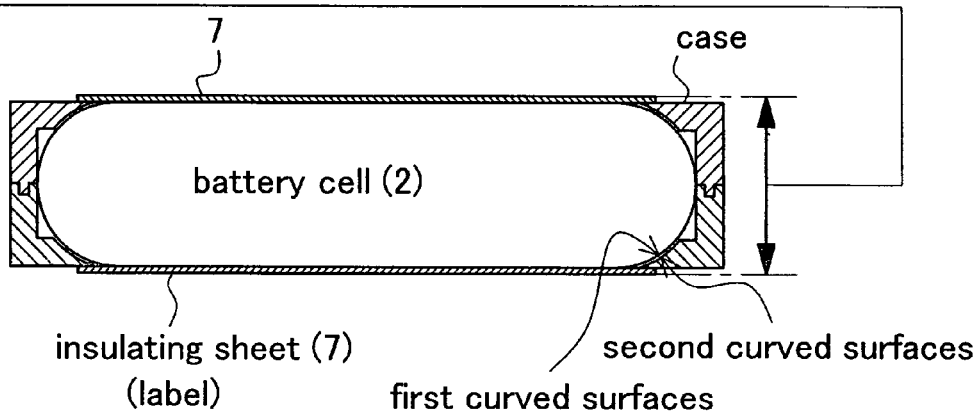
(B) JP2002-124235
JP2002-117819
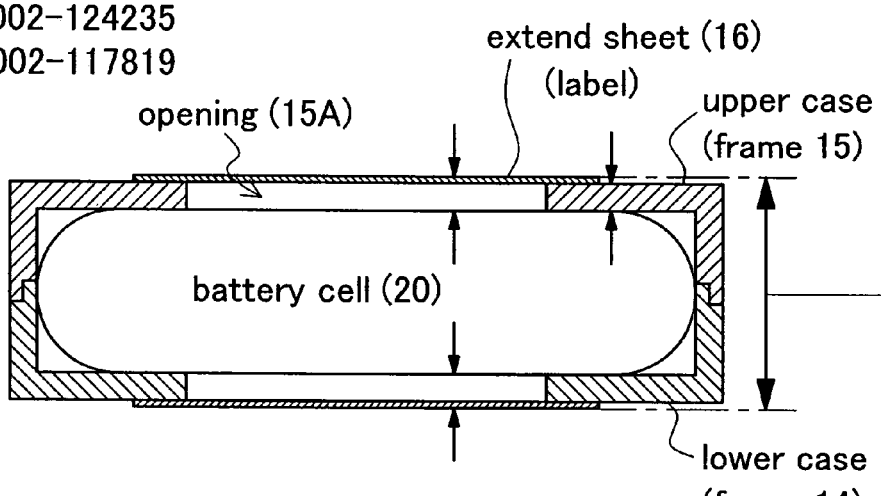

EXHIBIT II (cont.)
(C) INVENTION
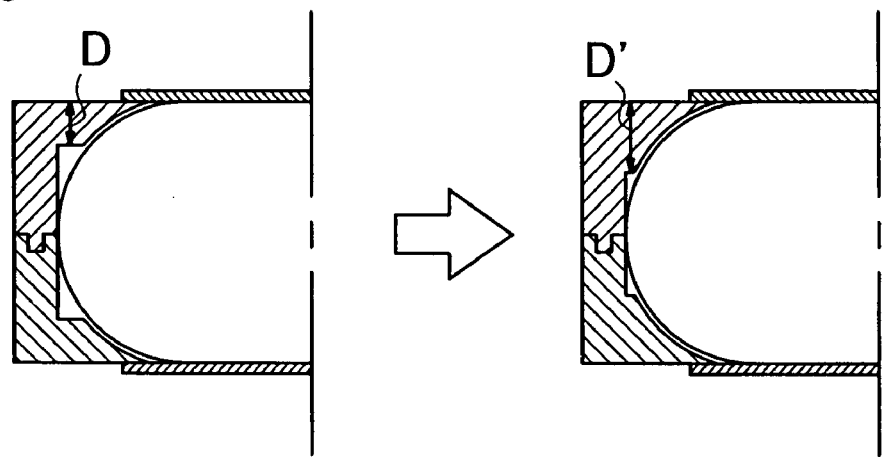
(D) JP '819
JP '235
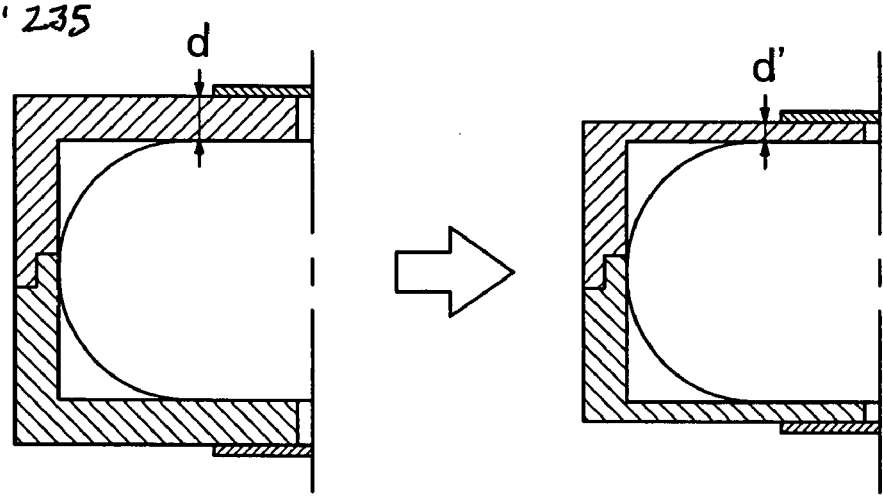

BATTERY PACK

This application is based on Applications No. 129356 filed in Japan on Apr. 30, 2002, No. 316184 filed in Japan on Oct. 30, 2002, and No. 118754 filed in Japan on Apr. 23, 2003, the contents of which are incorporated hereinto by reference.

BACKGROUND OF THE INVENTION

This invention relates to a battery pack having a thin outline battery fixed in a case.

Battery packs with thin outline batteries are conveniently used by attachment to various portable electrical equipment. In particular, this is the optimum configuration for electrical equipment, such as the portable telephone (cellular telephone), with design requirements for an overall thin outline. Since the overall shape of this type of battery pack is limited by battery thickness, research is being performed to determine how thin the battery can be made. Presently, the polymer battery has been developed as an extremely thin outline battery. The polymer battery is extremely thin overall because aluminum laminate film is used as its exterior. In addition, thin outline lithium ion rechargeable batteries are being developed using steel or aluminum as external cases.

Recently developed thin outline batteries, such as the polymer battery and the lithium ion rechargeable battery, are already designed considerably thin. Further, research is being performed to make these thin outline batteries even thinner without decreasing their charge capacity. Even battery packs which house thin outline batteries are being designed for overall thinness. In particular, battery packs, which attach to electrical equipment requiring a thin shape, such as portable electronics, are required to be designed even thinner. Consequently, design of a thin outline battery pack which does not reduce the charge capacity of the thin outline battery is extremely important, and a battery pack realizing this is in demand.

The present invention was developed with the object of making the battery pack thin by an extremely simple structure without making the thin outline battery itself any thinner. Thus it is a primary object of the present invention to provide a battery pack, which allows battery pack overall thickness to be reduced to the extreme without changing the thickness of the thin outline battery.

SUMMARY OF THE INVENTION

In the battery pack of the present invention, a thin outline battery with a thickness smaller than its width is held in an external case. The external case is made in the form of a rectangular frame which covers both side and both end surfaces of the thin outline battery and which is provided with openings exposing the front and back surfaces of the thin outline battery to the outside. The thickness of the external case is made approximately equal to the thickness of the thin outline battery, or it is made thinner than the thin outline battery.

The battery pack described above has the characteristic that the thin outline battery is not made any thinner, but the overall thickness of the battery pack which holds the battery can be made as thin as possible. This is because the external case of the battery pack, which holds the thin outline battery, is made to cover both sides and both ends of the battery, but is provided with openings to expose the front and back surfaces of the battery to the outside. This configuration of battery pack does not cover front and back surfaces of the thin outline battery with an external case as in prior art. Therefore, it is possible to make the battery pack thickness the same as the thin outline battery thickness while holding the battery in the external case.

The external case can be configured with side wall case sections to cover both side walls of the thin outline battery and end region case sections to cover both end regions of the thin outline battery. The inside surfaces of the side wall case sections can be provided with retaining troughs, and central protruding regions on both side walls of the thin outline battery can be inserted in these retaining troughs to hold the battery fixed. In addition, a terminal holder for output terminals can be disposed in an end region case section or in a side wall case section.

Further, the external case can be configured as a first case and a second case divided between the front and back surfaces of the thin outline battery. The first case and the second case can be configured with side wall case sections and end region case sections, and the first and second case side wall case sections and end region case sections can be connected to hold the thin outline battery. The first and second cases can be joined by weld attachment. Further, the surfaces of the thin outline battery can be covered with insulating material. In addition, insulating sheet can be adhered to the thin outline battery and external case to cover the thin outline battery. The surfaces of the thin outline battery and external case to which insulating sheet is attached may have non-planar regions such as ridges, protrusions, or recessions. Insulating sheet shaped to fit along these non-planar regions can be adhered to attachment surfaces of the thin outline battery and external case. Surface treatment formed along the non-planar regions can keep those non-planar regions from standing out.

Insulating sheet edge regions can be disposed between the thin outline battery and the external case allowing insulating sheet edge regions to be sandwiched between, and held by the thin outline battery and external case.

The battery pack described above has the characteristic that not only can the surfaces of the thin outline battery be insulated by the insulating sheet, but the insulating sheet can be effectively prevented from peeling off from the edge regions.

The cap region of the thin outline battery can also be insulated by disposing insulating sheet over thin outline battery cap region.

Compartments to house protection circuitry can be provided in an end region case section or in a side wall case section which is disposed at the output terminals. Protection circuitry can be contained in these compartments and insulated from the outside. A terminal holder positioned to hold the output terminals in a fixed position can also house protection circuitry. This terminal holder can be contained in an end region case section or in a side wall case section of the external case. An insulating ring with a through hole can be provided for insertion of a protruding battery terminal at an end plane of the thin outline battery. The thin outline battery end plane can be insulated by inserting the protruding battery terminal into the through hole. Finally, protection devices can be connected at positive and negative terminals of the thin outline battery, and the thin outline battery can be a lithium ion rechargeable battery or a polymer battery.

The above and further objects and features of the invention will more fully be apparent from the following detailed description in conjunction with the accompanying drawings.

BRIEF DESCRIPTION OF THE DRAWINGS

FIG. 2 is a side view in cross-section of the battery pack shown in FIG. 1.

DETAILED DESCRIPTION OF THE INVENTION

Figure 1:
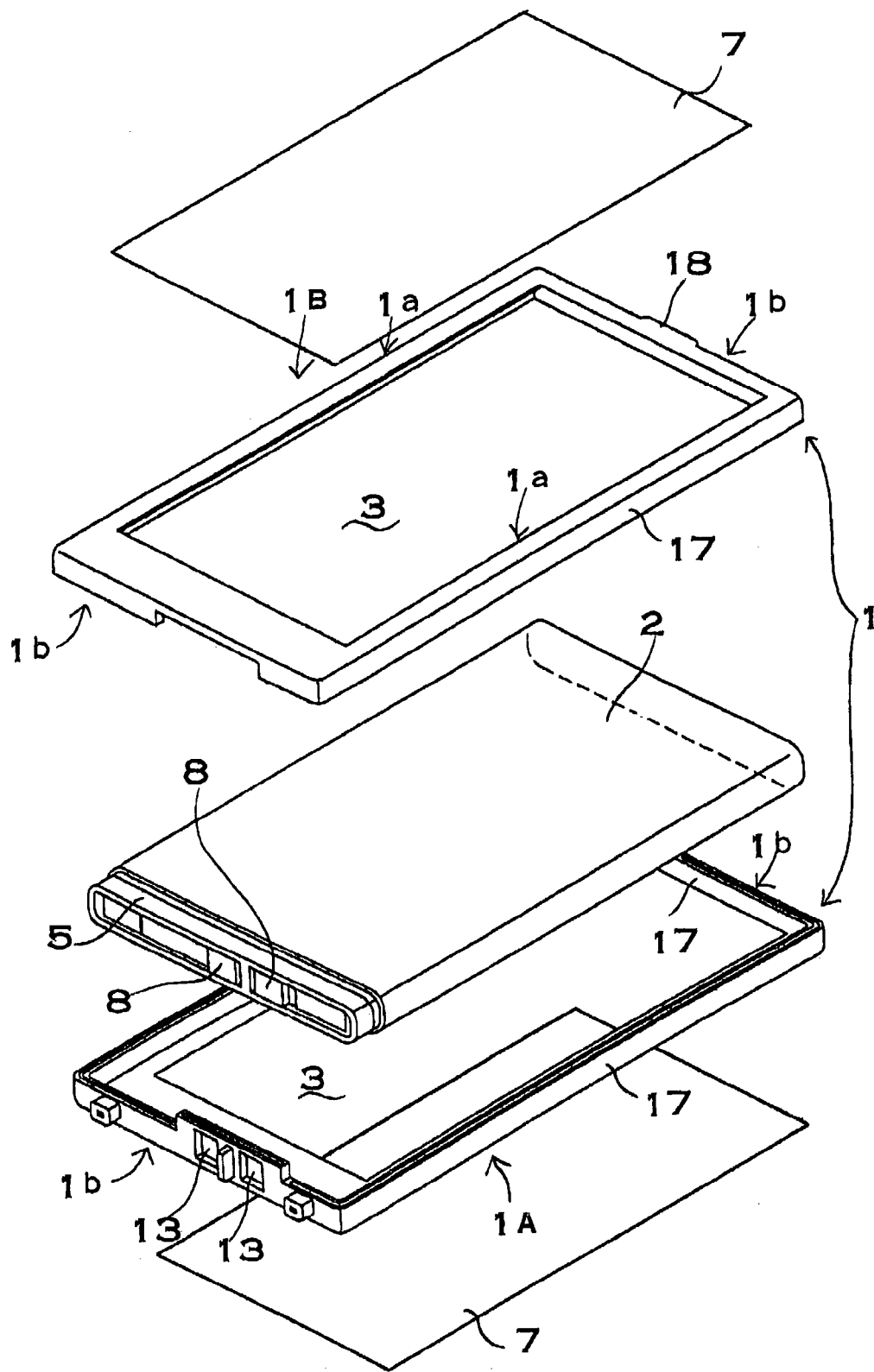
FIG. 1 is an exploded oblique view of a battery pack constructed in accordance with an embodiment of the present invention.

The battery pack shown in FIG. 1 is provided with an external case 1 and a thin outline battery 2 mounted in the external case 1. The thin outline battery 2 is a rechargeable battery which is wider than it is thick. The thin outline battery 2 is a lithium ion rechargeable battery or a polymer battery. The polymer battery is a lithium polymer battery. However, the present invention does not limit the thin outline battery to a lithium ion rechargeable battery or a polymer battery. The thin outline battery may also be a different type of battery, such as a nickel hydrogen battery or a nickel cadmium battery.

The external case 1 is made by shaping an insulating material. The preferable insulating material for forming the external case 1 is plastic. The external case 1 shown in the figures is provided with openings 3 which expose the front and back of the thin outline battery 2 to the outside. The external case 1 is formed in the shape of a rectangular frame which covers both side walls and both end planes of the thin outline battery 2. The external case 1 is provided with side wall case sections 1a to cover both side walls of the thin outline battery 2 and end region case sections 1b to cover both end planes of the thin outline battery 2. As shown in the cross-section side view of FIG. 2, the side wall case sections 1a are provided with retaining troughs 4. The central protruding regions 2A of both side walls of the thin outline battery 2 are inserted into the side wall case section 1a retaining troughs 4 of the external case 1. An external case 1 with this structure holds both sides of the thin outline battery with side wall case sections 1a, and prevents the thin outline battery 2 from failing out the front or back directions indicated by arrows A and B in FIG. 2. As shown in the cross-section view of FIG. 2, by inserting the central protruding regions 2A of a thin outline battery 2 into retaining troughs 4, the side wall case sections 1a do not project into the front and back planes of the thin outline battery 2, and the battery is prevented from shifting front-ward or backward. Thin outline batteries such as lithium ion rechargeable batteries and polymer batteries are shaped such that both side walls are curved with a given radius of curvature. The curved surfaces of both thin outline battery 2 side walls have rounded corner edges and central protruding regions. Therefore, with the rounded corner edges inserted in both side walls of the retaining troughs 4, the side wall case sections 1a remain flush with the front and back of the thin outline battery 2, and the thin outline battery 2 is held without shifting position towards the front or back. However, in the battery pack of the present invention, retaining troughs 4 do not necessarily have to be provided in side wall case sections 1a, and thin outline battery side walls may also be fixed to inside surfaces of side wall case sections with bond, adhesive, or double-sided adhesive tape.

Figure 3:
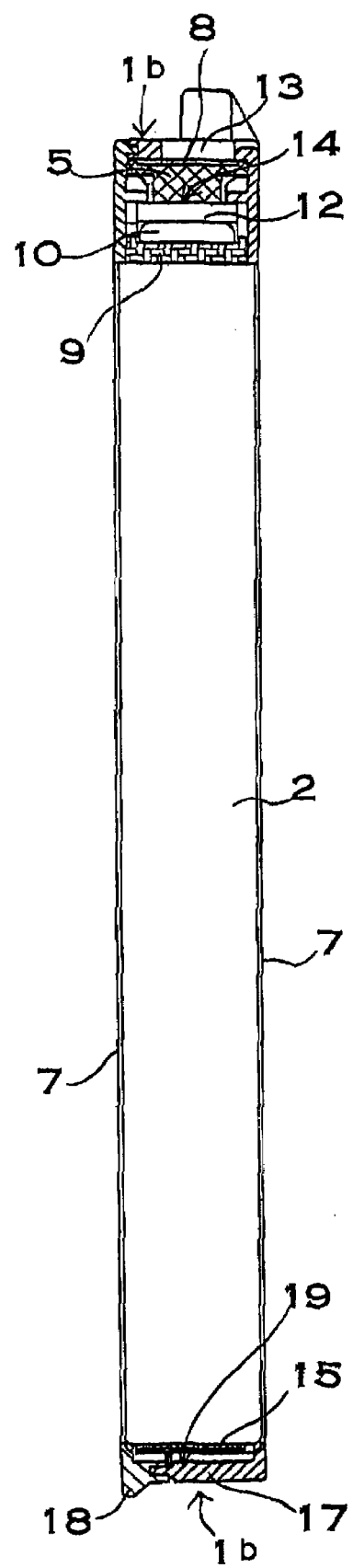
FIG. 3 is a lengthwise cross-section view of the battery pack shown in FIG. 1.

As shown in the cross-section views of FIGS. 2 and 3, the external case 1 is shaped such that neither the side wall case sections 1a or the end region case sections 1b protrude beyond the front or back planes of the thin outline battery 2, and the thickness of the external case 1 is essentially equal to the thickness of the thin outline battery 2. Parts of the side wall case sections 1a and end region case sections 1b of the external case 2 of the figures are formed flush with the front and back planes of the thin outline battery 2. For a battery pack with insulating sheet 7, such as labels, attached to the front and back of the thin outline battery 2, the external case 1 and thin outline battery 2 can be made equal in thickness by increasing external case 2 thickness only to account for the thickness of the insulating sheet 7. However, the battery pack of the present invention can also be made thinner than the thin outline battery, or it can be made to protrude slightly beyond the plane of the front of the thin outline battery. For a battery pack with an external case which protrudes beyond the thin outline battery, a cavity can be provided in the battery attachment plane of electrical equipment to allow the protruding part of the battery pack to mate with the electrical equipment. Consequently, in this patent application, the description "the thickness of the external case is essentially equal to the thickness of the thin outline battery" is meant to also include the configuration where the external case protrudes very slightly beyond the front plane of the thin outline battery, and the external case is thicker than the thin outline battery and by a small amount, for example 1 mm or less.

The battery pack of FIGS. 1 and 3 has a terminal holder 5 for output terminals 8 disposed inside an end region case section 1b of the external case 1. In the battery pack of the figures, the terminal holder 5 is housed in the end region case section 1b which covers the protruding electrode 10 end of the thin outline battery 2, and output terminals 8 are disposed here. The end region case section 1b opposite the end of the protruding electrodes 10, covers the bottom end of the thin outline battery 2. The terminal holder 5 is formed from insulating material. The preferable insulating material for forming the terminal holder 5 is plastic. The terminal holder 5 is formed with an outline approximately equal to or slightly smaller than the outline of the thin outline battery 2 end plane with the protruding electrode 10. The terminal holder 5 is shaped such that it does not protrude outward beyond the thin outline battery 2 when viewed from an end plane of the battery. The terminal holder 5 is provided with a pair of output terminals 8 corresponding to opposite battery end planes. Output terminals 8 are metal plates which are attached to the terminal holder 5 or sandwiched between the terminal holder 5 and the external case 1 to hold them in fixed positions.

The terminal holder 5 is disposed inside an external case 1 end region case section 1b. The terminal holder 5 is sandwiched between the inside surface of the end region case section 1b and the thin outline battery 2 end plane to hold it in a fixed position. Electrode windows 13 are cut through the end region case section 1b of the external case 1. The electrode windows 13 expose output terminals 8, attached to the terminal holder 5, outside the external case 1. Consequently, electrode windows 13 are positioned where they can hold the terminal holder 5 at a fixed position inside the external case 1 and expose the output terminals 8 to the outside. The terminal holder 5 housed in the external case 1 is pressed against the thin outline battery 2 holding it in a fixed position and accurately disposing the output terminals 8 in fixed positions. However, the terminal holder can also be disposed inside an external case side wall case section. Here, the terminal holder is sandwiched between, and hold in a fixed position between the inside surface of the side wall case section and the thin outline battery side wall. In this external case, electrode windows are cut through the side wall case section, and output terminals attached to the terminal holder are exposed outside the external case.

Figure 4:
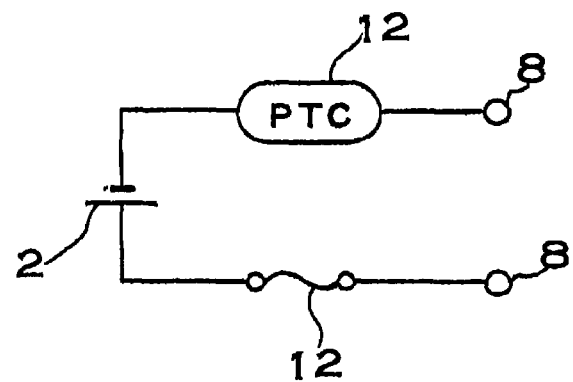
FIG. 4 is a circuit diagram of the battery pack shown in FIG. 1.

The pair of output terminals 8 of the battery pack are connected to positive and negative electrodes of the thin outline battery 2 via protection devices 12. FIG. 4 shows a circuit diagram of the battery pack. In this battery pack, the positive and negative battery electrodes are connected to the pair of output terminals 8 via protection devices 12. The electrode on one side is connected to an output terminal 8 via a PTC device, and the electrode on the other side is connected to an output terminal 8 via a fuse. The battery pack of this circuit diagram has its positive output terminal 8 connected to the positive electrode of the thin outline battery 2 via a fuse, and its negative output terminal 8 connected to the negative electrode of the thin outline battery 2 via a PCT device. The fuse and PTC device can also be connected in reverse of this circuit diagram. Further, both output terminals 8 can also be connected to thin outline battery electrodes via fuses or both output terminals 8 can also be connected to thin outline battery electrodes via PTC devices. A battery pack with protection devices 12, connected to both the positive and negative thin outline battery electrodes, can be safely used even if an output terminal 8 and a thin outline battery 2 electrode are mistakenly short circuited. This is because a protection device 12 will activate to cut-off short circuit current even if either thin outline battery 2 electrode connects with an output terminal 8. The battery pack insulates the surfaces of both the battery case and the protruding electrode 10. Consequently, short circuit current will not flow under conditions of normal use. However, short circuit current may flow if the insulating sheet 7 covering the surfaces of the thin outline battery 2 case becomes damaged, or if metal wire is inserted inside the external case 1 and contacts the protruding electrode 10. For example, if metal inadvertently connects the battery case to the negative output terminal 8, and if thin outline battery case insulation is incomplete, short circuit current can flow. In addition, if metal wire is inserted between the external case 1 and the thin outline battery 2, and if this wire touches the positive output terminal 8, short circuit current can flow. In a battery pack with protection devices 12 connected between both output terminals 8 and positive and negative battery electrodes, protection devices 12 are activated to cut-off the flow of short circuit current if it occurs.

Figure 5:
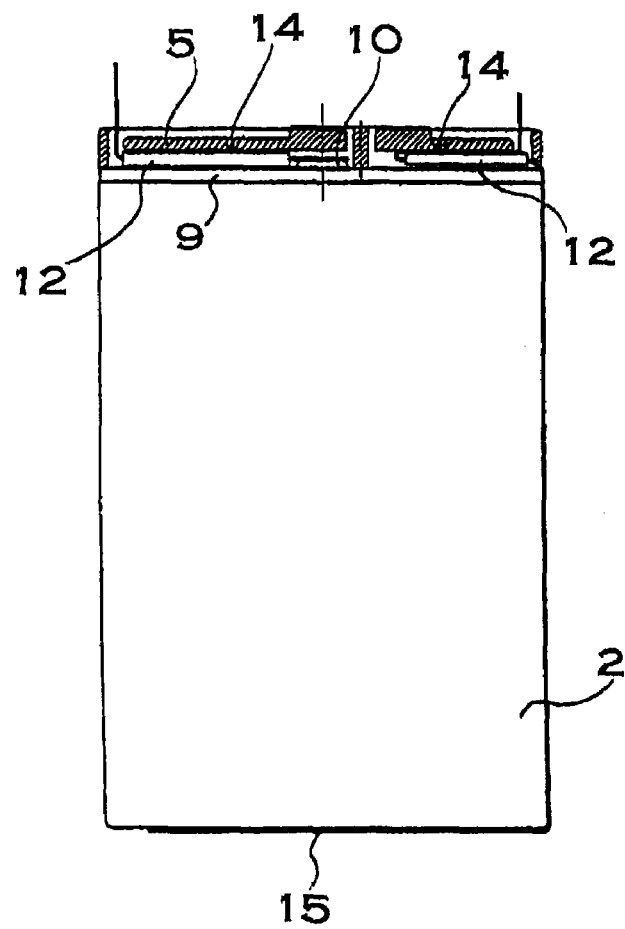
FIG. 5 is a front view partially in cross-section showing a thin outline battery with a terminal holder attached.

As shown in the cross-section view of FIG. 5, protection devices 12 are disposed inside the terminal holder 5. The terminal holder 5 of the figure is provided with compartments 14 between the terminal holder 5 and the opposing surface of the thin outline battery 2, and protection devices 12 are disposed in the compartments 14. In a battery pack having no terminal holder 5, compartments are provided in the external case 1 end region case section 1b, and protection devices 12 are housed in those compartments.

The battery pack of the figures is provided with protection devices 12 as protection circuitry. However, the battery pack may also have protection circuitry that detects current and cuts-off current flow when excessive current is detected, or that measures battery voltage and cuts-off current flow when battery over-charge or over-discharge is detected. These or other protection circuits can also be housed in the terminal holder 5 or external case 1. An external case 1 housing a protection circuit is provided with a compartment 14, and the protection circuit is contained within that compartment 14 and insulated from the outside. A protection circuit is implemented by surface mounting electronic components on a printed circuit board. A battery pack containing a protection circuit may have the protection circuit inside a terminal holder 5 which holds output terminals 8 in a fixed position, and this terminal holder 5 can be housed inside the external case end region case section 1b. A terminal holder containing a protection circuit can also be housed inside an external case 1 side wall case section 1a.

Figure 6:
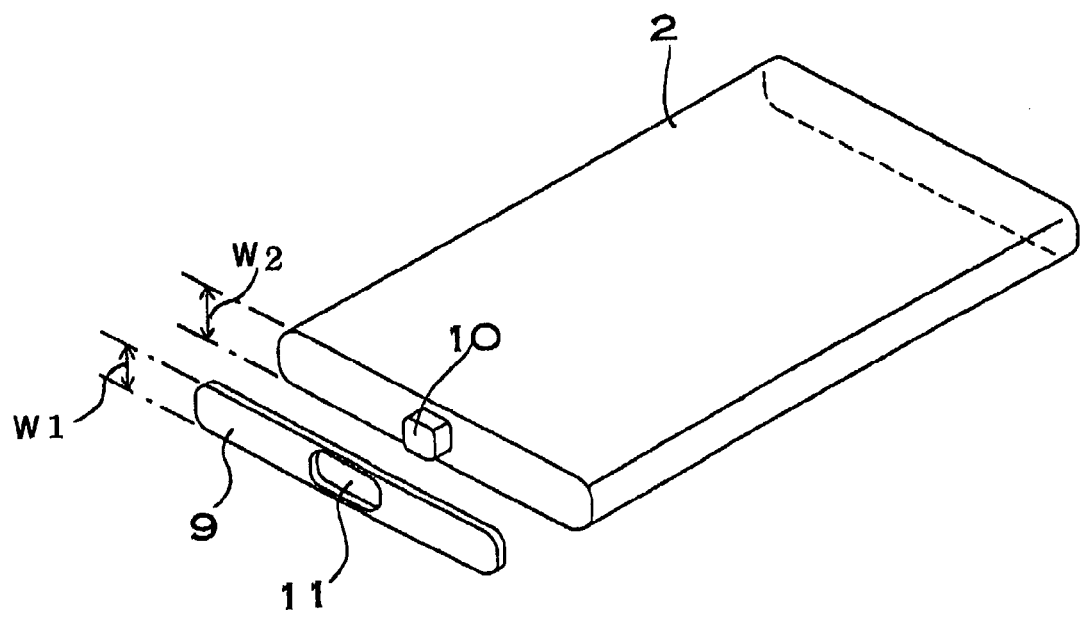
FIG. 6 is an exploded oblique view showing a thin outline battery and an insulating ring.

As shown in FIG. 6, the thin outline battery 2 has an insulating ring 9 disposed at the terminal holder end of the battery. Since the terminal holder end of the thin outline battery 2 is the battery end plane provided with the protruding electrode 10, the insulating ring 9 is disposed at the protruding electrode end of the battery. The insulating ring 9 is provided with a through hole 11 for insertion of the protruding electrode 10. The protruding electrode 10 is inserted in the insulating ring 9 through hole 11 and the insulating ring 9 is fixed to the battery end plane insulating the end plane. The insulating ring 9 is bond attached to the battery end plane, or it is attached to the battery end plane via double sided tape, or it is attached to the battery end plane via an adhesive layer. The width (W1) of the insulating ring 9 is smaller than the width of the battery end plane (W2). Preferably, the length of the insulating ring 9 is also shorter than the length of the terminal holder 5. As shown in the cross-sectional view of FIG. 3, the insulating ring 9 mates with the inside surfaces of the terminal holder 5 holding it in a fixed position.

Figure 7:
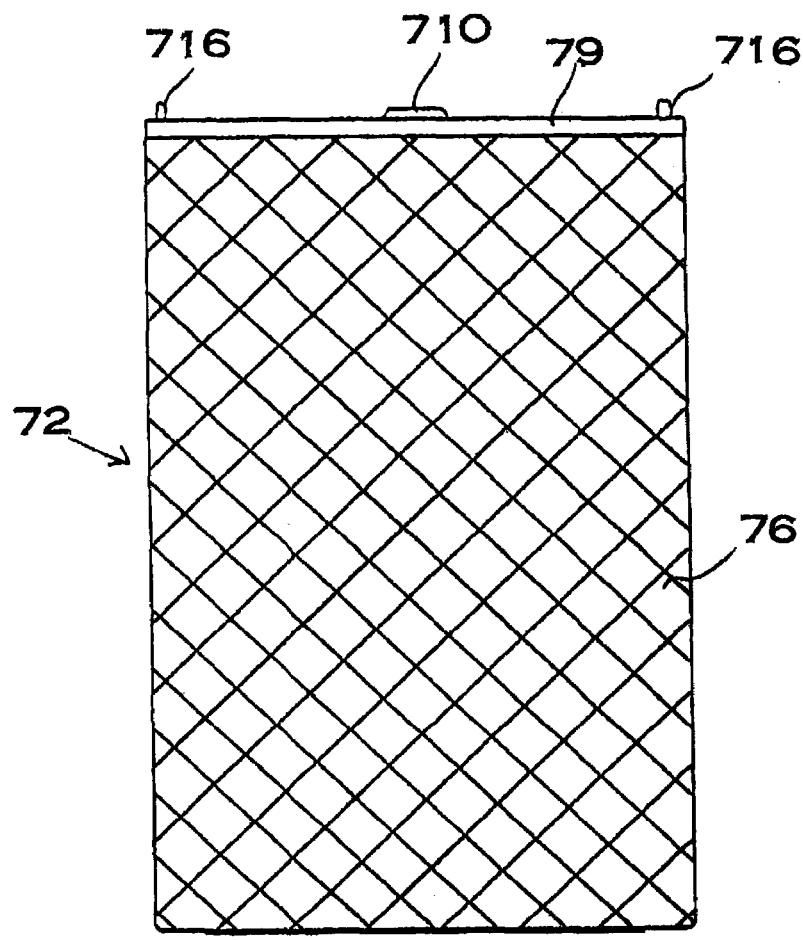
FIG. 7 is a front view showing an insulating ring on an end plane of a thin outline battery.
Figure 8:
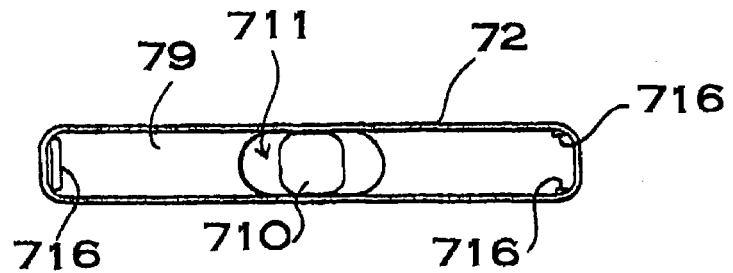
FIG. 8 is a plan view showing an insulating ring on an end plane of a thin outline battery.
Figure 9:
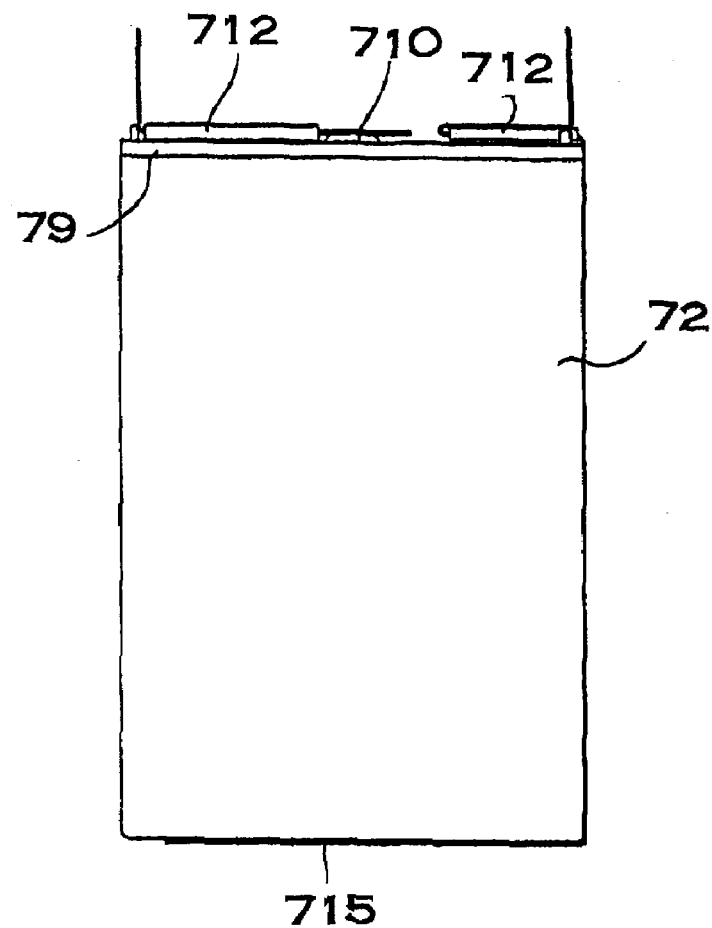
FIG. 9 is a front view showing two protection devices connected to a thin outline battery.

The insulating ring 9 is made by forming an insulating material such as plastic. As shown in FIGS. 7 and 8, coupling projections 716 can be formed as a single piece with the insulating ring for fitting protection devices and the terminal holder on the upper surface of the insulating ring. The insulating ring 79 is provided with rib shaped coupling projections 716 at both end regions. As shown in FIG. 9, the coupling projections 716 mate with protection devices 712 disposed at the battery end plane and retain them in fixed positions. In addition, the coupling projections 716 can be formed to mate with the bottom of the terminal holder. The coupling projections 716 can interlock with the terminal holder and hold the terminal holder in a fixed position. In FIGS. 7 through 9, 710 is the protruding electrode, 711 is the through hole, and 715 is a conducting lead.

A battery pack with an insulating ring 9, 79 disposed at an end plane of the thin outline battery 2, 72 can also be configured to absorb thin outline battery 2, 72 length error via the insulating ring 9, 79. In particular, an insulating ring 9, 79 made of sheet material with thickness which can elastically deform, such as non-woven fabric, insulating paper, or rubber type elastic sheet, can absorb thin outline battery 2, 72 length error with a single insulating ring 9, 79. In addition, insulating rings 9, 79 which do not elastically deform can absorb thin outline battery 2, 72 length error by adjusting the number of insulating ring 9, 79 layers used. However, in a battery pack which absorbs thin outline battery 2, 72 length error via insulating rings 9, 79, the insulating rings 9, 79 do not insert entirely within the inside surfaces of the terminal holder. Either one part or the entire perimeter of the insulating rings 9, 79 is configured to be sandwiched between the battery end plane and the terminal holder, insulating ring 9, 79 elastic restoring force presses against the terminal holder, and insulating rings 9, 79 shim the terminal holder in this structure. In this type of battery pack, the terminal holder is disposed in a fixed position on the external case regardless of thin outline battery dimensions, and output terminals are disposed in accurate positions.

The external case 1 of FIGS. 1 through 3 is provided with a first case section 1A and a second case 1B divided between the front and back surfaces of the thin outline battery 2. The side walls 17 of the first case section 1A and second case 1B join together to hold the thin outline battery 2. The first case 1A and second case 1B each are provided with side wall case sections 1a and end region case sections 1b. The side walls 17 of the side wall case sections 1a of the first case 1A and second case section 1B join together, and the side walls 17 of the end region case sections 1b of the first case 1A and second case 1B also join together. Opposing surfaces of the side walls 17 of the first case 1A and second case 1B are ultrasonic weld attached to simply and reliably join the first case 1A and the second case 1B. The first case 1A and the second case 1B, which are joined by ultrasonic welding, are formed as single pieces from heat pliable plastic. As shown in the oblique view of FIG. 1 and the cross-section view of FIG. 2, opposing surfaces of the ultrasonically welded side walls 17 have lengthwise grooves on one side and projections which fit in those grooves on the other side. The side walls 17 are ultrasonically weld attached with the projections inserted in the grooves to join the first case 1A and second case 1B with a more reliable weld that won't separate. However, opposing surfaces of the first case section 1A and second case section 1B can also be joined by bond attachment.

The side walls 17 of the first case section 1A and second case section 1B shown in the figures have approximately the same height. In this external case 1, the thin outline battery 2 is inserted into the first case section 1A, the side walls 17 of the first case section 1A and second case section 1B are joined, and the side walls 17 can be ultrasonically welded in this configuration. In an external case 1 joined in this fashion, the first case section 1A and second case section 1B can be joined without side wall 17 misalignment by inserting projections into corresponding grooves provided in opposing surfaces of the side walls 17. Consequently, side walls 17 of both the first case section 1A and the second case section 1B can be accurately aligned and joined in this configuration.

Figure 10:
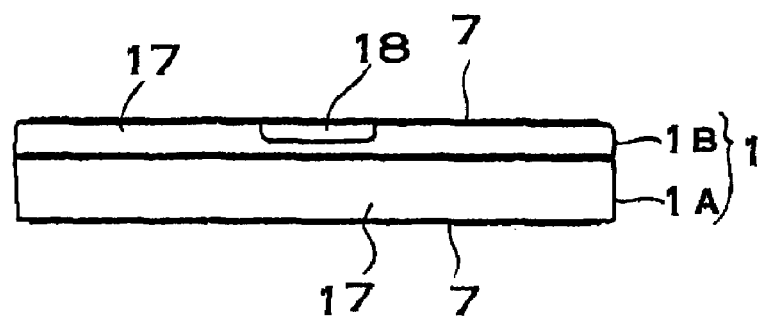
FIG. 10 is a rear view of the battery pack shown in FIG. 1.
Figure 11:
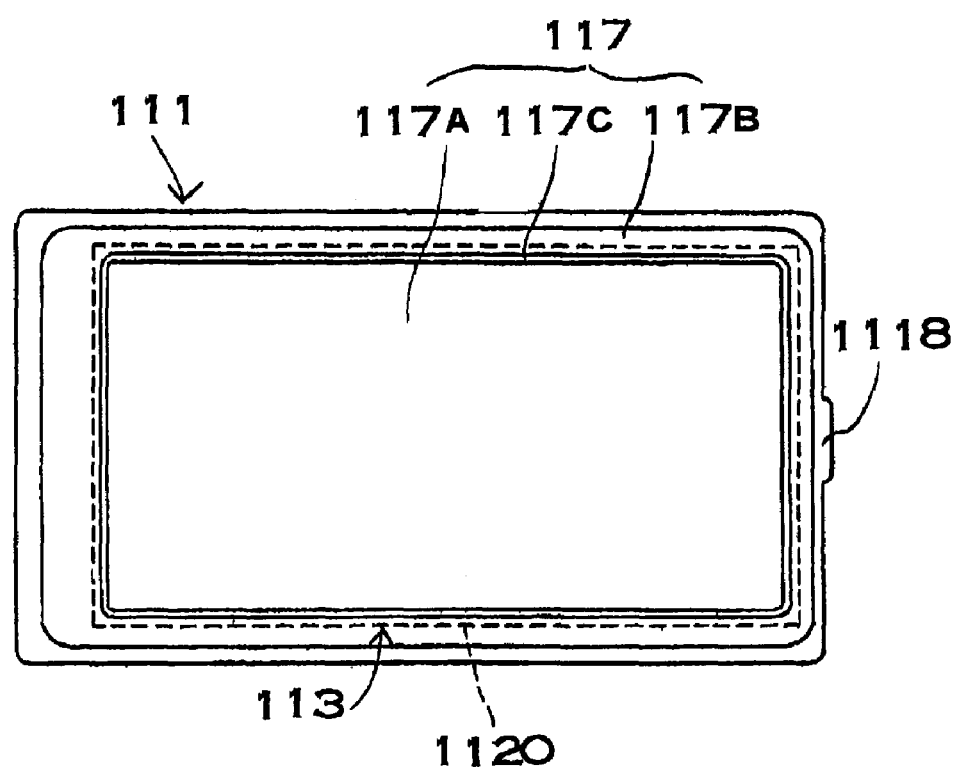
FIG. 11 is a plan view of a battery pack constructed in accordance with another embodiment of the present invention.

As shown in the cross-section view of FIG. 2 and the rear view of FIG. 10, the thin outline battery 2 held within the joined first case section 1A and the second case section 1B has its surfaces covered by insulating sheet such as labels. As shown in FIG. 1, insulating sheet 7 is attached to close off the entire area of the openings 3 in the external case 1, and to insulate all surfaces of the thin outline battery case exposed outside the external case 1. This structure allows a thin outline battery 2 with no surface insulation treatment to have its battery case insulated. However, the battery pack of the present invention also allows for no attachment of insulating sheet 7 to battery case surfaces. As shown by the cross-hatching in FIG. 7, battery case surfaces can also be coated with insulating material 76 to insulate the battery case. In a battery pack housing of this type of thin outline battery 72, it is not necessary to attach insulating sheet over the openings in the external case. However, surfaces of the battery case can be coated with insulating material 76, and insulating sheet can also be attached over the openings in the external case for redundant insulation.

Further, insulating sheet 7 can be attached to cover both the thin outline battery 2 and the external case 1. As shown in FIG. 2, insulating sheet 7 is attached with its peripheries overlapping the external case 1 at the edges of the openings 3. In this type of structure with insulating sheet peripheries attached to the external case 1, the external case 1 and the thin outline battery 2 can be held together as a single unit by the insulating sheet 7. This has the feature that shifting of the thin outline battery 2 relative to the external case 1 can be reliably prevented. In a battery pack with non-planarity, such as ridges, cavities, and projections, in the insulating sheet attachment surface on the thin outline battery and external case, insulating sheet formed to fit along the non-planar regions can be attached to that surface. In the battery pack shown in FIGS. 11 and 12, the external case 111 is designed thicker than the periphery of the thin outline battery 112, and non-planar region 1120 ridges are formed along the case-battery boundary. As shown in FIG. 13, insulating sheet 117 adhered to the thin outline battery 112 and external case 111 attachment surfaces of this battery pack have central battery attachment regions 117A which are depressed inward more than the periphery case attachment regions 117B. However, as shown in FIG. 14, in a battery pack with the external case 141 designed thinner than the thin outline battery 142 periphery, insulating sheet 147 adhered to the thin outline battery 142 and external case 141 attachment surfaces have battery attachment regions 147A which can protrude further outward than case attachment regions 147B. In FIGS. 11 through 13, 111A is the first case, 111B is the second case, and 1118 is a handling clasp. In FIG. 14, 141A is the first case, 141B is the second case, 147C are ridges in the insulating sheet 147, and 1420 are non-planar regions.

Figure 12:
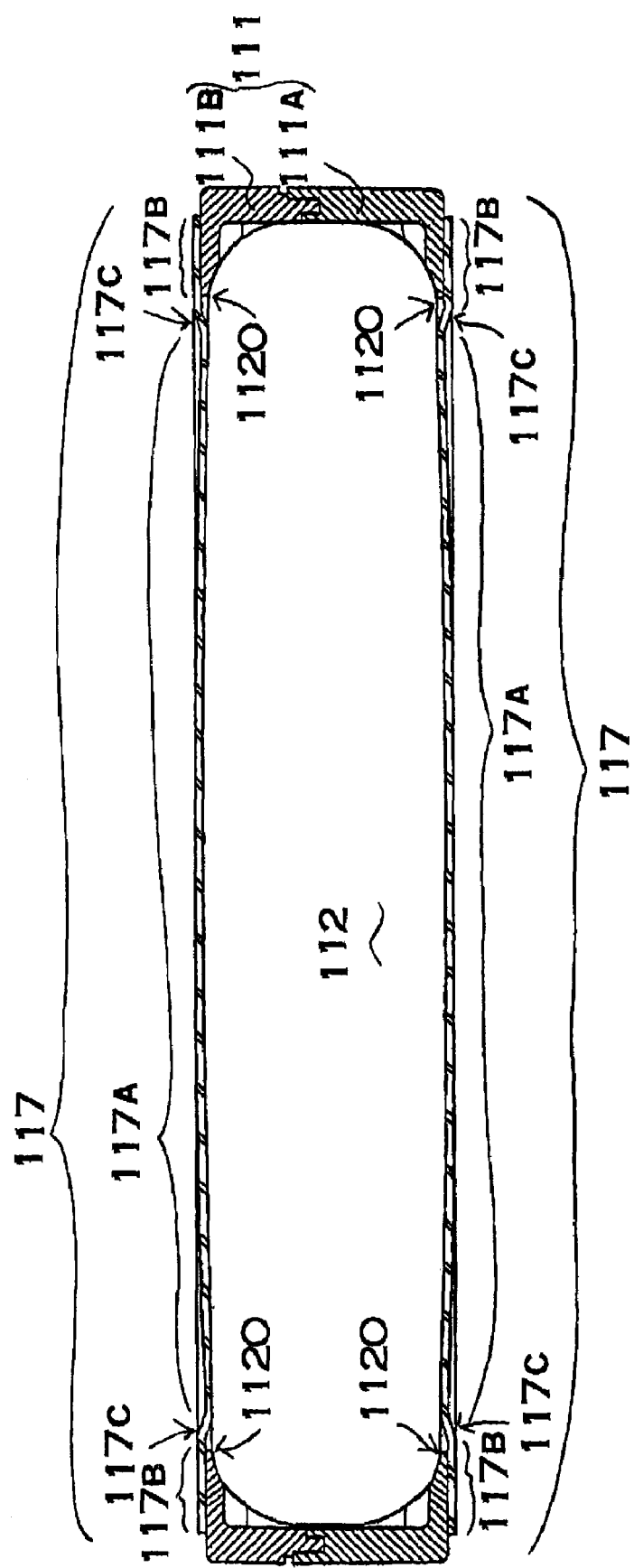
FIG. 12 is a side view in cross-section of the battery pack shown in FIG. 11.
Figure 13:
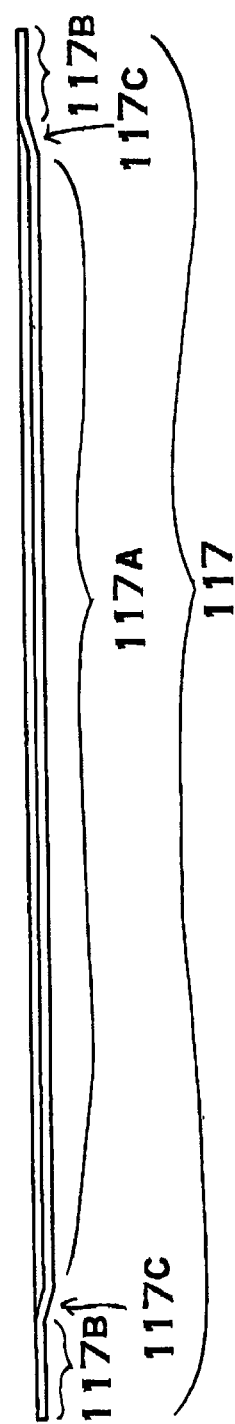
FIG. 13 is a cross-section view of the insulating sheet attached to the battery pack shown in FIG. 12.
Figure 14:
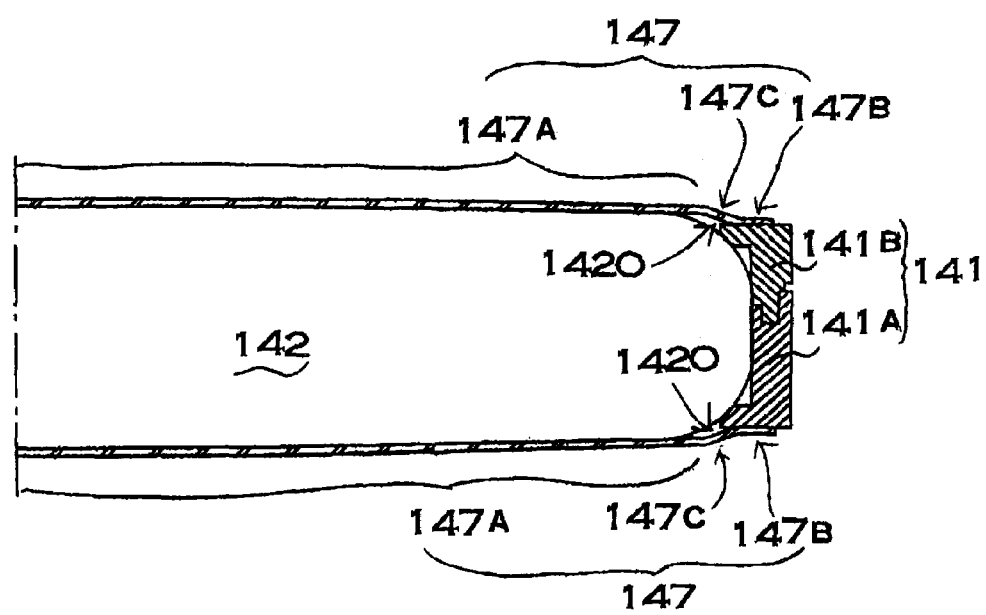
FIG. 14 is a cross-section view of a battery pack of another embodiment of the present invention.

The insulating sheet 117 shown in FIGS. 12 and 13 has battery attachment regions 117A which adhere to the thin outline battery 112 case, case attachment regions 117B which adhere to the external case 111, and non-planar ridge regions 117C formed between the battery and case attachment regions. These ridge regions 117C are between the battery attachment regions 117A and the case attachment regions 117B, and are formed at attachment surfaces positioned corresponding to non-planar regions 1120. Insulating sheet 117 with this shape can be formed, for example, by press-forming planar sheet into sheet with ridges. In the battery pack shown in FIG. 11, non-planar regions 1120 are formed along the edges of openings 113 in the external case 111. Consequently, ridge regions 117C of the insulating sheet 117 are formed along the edges of the openings 113. This configuration of insulating sheet 117 is attached to the thin outline battery 112 and external case 111 with non-planar ridge regions 117C disposed at non-planar region 1120 attachment surfaces. This type of insulating sheet 117 has the characteristic that these regions can be quickly attached while preventing wrinkles. In particular, since the insulating sheet 117 shown in FIG. 12 has ridge regions 117C with inclined surfaces, it has the feature that the inclined surfaces can absorb back and forth and side to side misalignment during attachment and prevent this region from standing out.

Further, surface treatment of the insulating sheet 117, 147 can be performed to prevent non-planar insulating sheet regions, formed along the non-planar regions 1120, 1420, from standing out. Although not illustrated, a plurality of parallel lines or numerous non-directional curved lines can be displayed, or shade differences or color differences can be used as surface treatment embellishments. These types of surface treatments utilize illusions such as light and color illusions to prevent non-planar regions of the insulating sheet 117, 147 from standing out. A battery pack which prevents non-planar regions of the insulating sheet 117, 147 from standing out has the feature that it has a pleasing exterior visual appearance.

FIGS. 15 through 19 show battery pack of other embodiments of the present invention. The thin outline batteries 152 shown in these and other figures have insulating sheet 157, such as labels, attached to cover their surfaces. In the following embodiments, structural elements which are the same as in previous embodiments shown in FIGS. 1 through 6, are numbered the same except for the two highest order digits, and their description is abbreviated.

Insulating sheet 157 attached to the thin outline battery 152 can be disposed over the cap region 152B of the thin outline battery 152 to serve the additional purpose of insulating the battery end plane. The thin outline battery cap region 152B is the region at the battery end plane where the protruding electrode 1510 is established and where the battery case opening is sealed off (capped) at the periphery. The battery pack shown in FIG. 17 has the ends of the insulating sheet 157 which attach to the surfaces of the thin outline battery 152, disposed to overlap the cap region 152B. Specifically, the insulating sheet 157 is disposed to extend outward in a direction from the edge at the battery case end towards the protruding electrode 1510. In this manner, insulating sheet 157 which extends over thin outline battery 152 cap region 152B can effectively insulate the protruding electrode 1510 and the battery end plane.

The insulating sheet 157 is plastic film. However, all types of insulating material processed in sheet form can be used as insulating sheet. For example, plastic film with metallic coating on its surface, or metal foil with insulating film, such as plastic, covering its surfaces can also be used. An adhesive layer is provided on the attachment side of the insulating sheet 157. This type of insulating sheet 157 can be attached to thin outline battery 152 surfaces via the adhesive layer without using bond attach. However, insulating sheet 157 can also be attached to thin outline battery 152 surfaces via bond attach. Further, insulating sheet 157, which has a heat pliable plastic film adhesive layer or which is entirely heat pliable plastic film, can also be fused to thin outline battery surfaces by ultrasonic welding or heat attachment.

Figure 15:
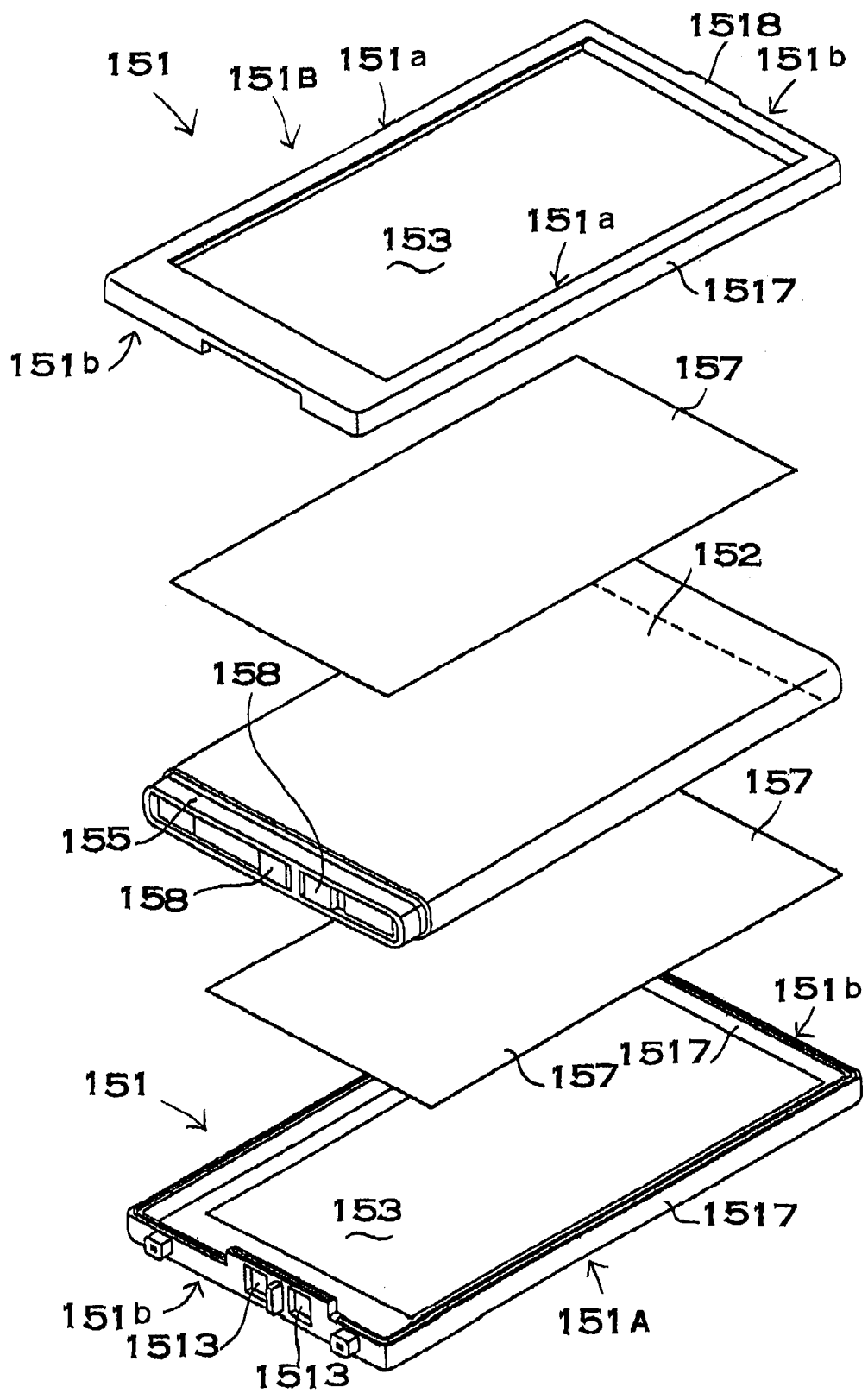
FIG. 15 is an exploded perspective view of a battery pack constructed in accordance with another embodiment of the present invention.
Figure 16:
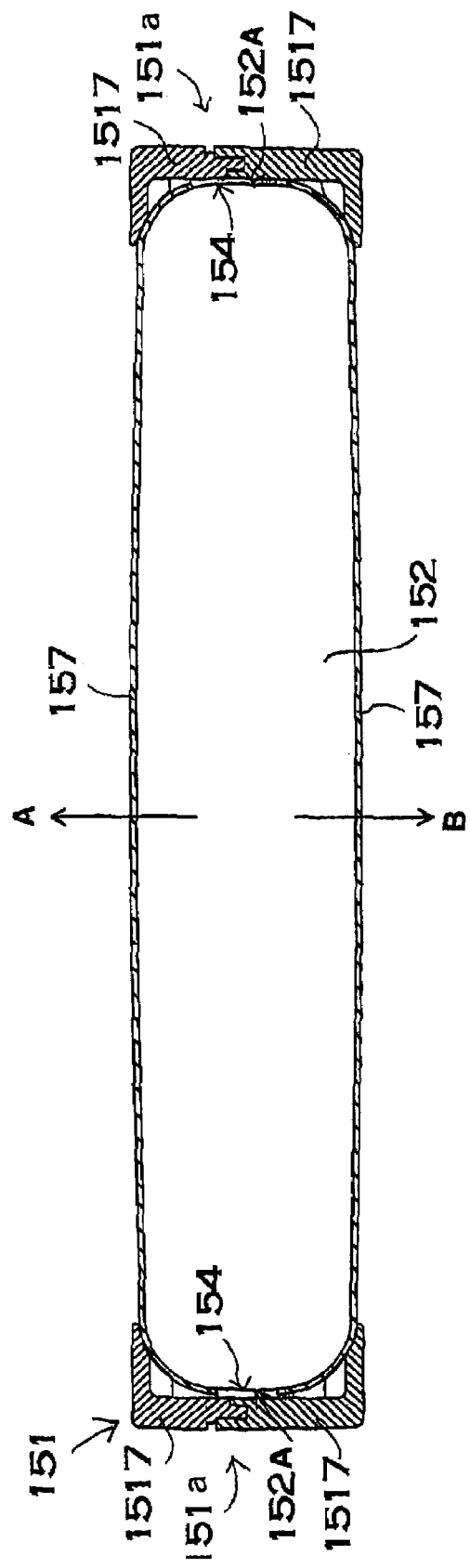
FIG. 16 is a side view in cross-section of the battery pack shown in FIG. 15.
Figure 17:
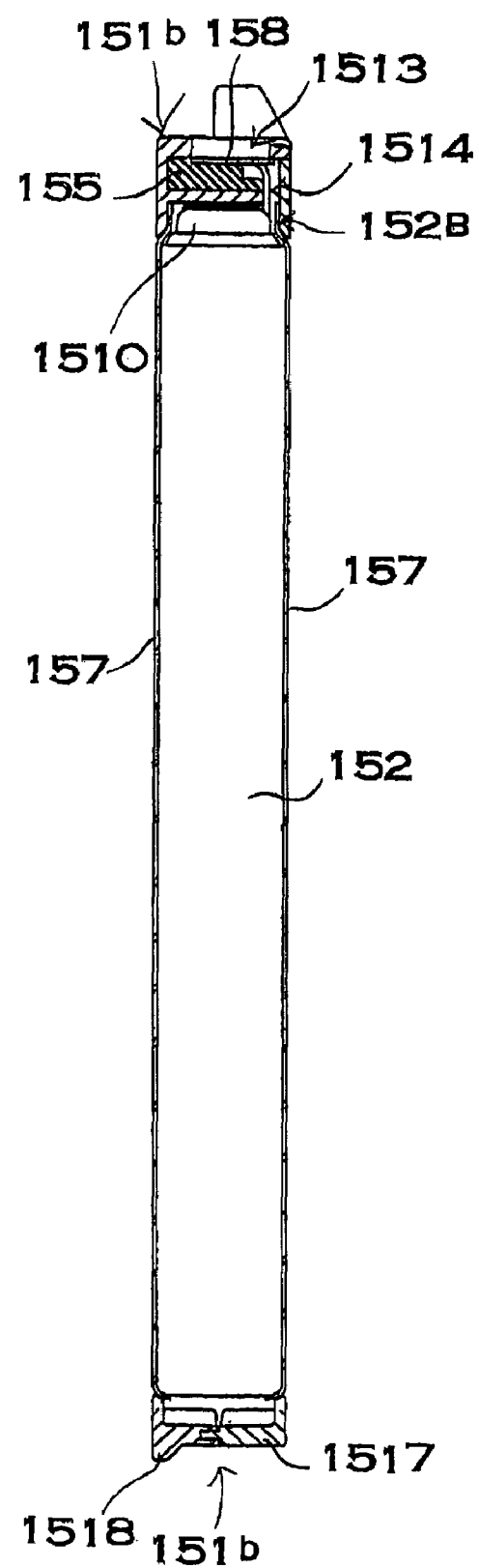
FIG. 17 is a lengthwise cross-section view of the battery pack shown in FIG. 15.
Figure 18:
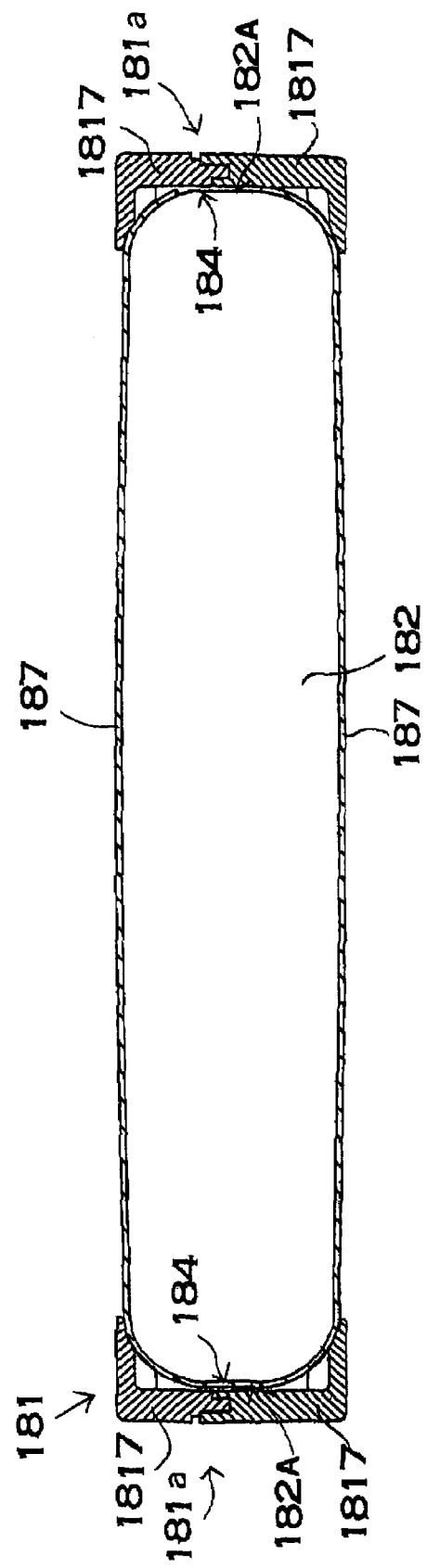
FIG. 18 is a side view in cross-section of a battery pack constructed in accordance with embodiment of the present invention.

As shown in FIGS. 15 and 16, thin outline battery 152 surfaces can be covered by two pieces of insulating sheet 157. Both sides of the thin outline battery 152 can also be covered by a single piece of insulating sheet 157 attached around the battery in a U-shape. In the battery pack shown in the cross-section view of FIG. 18, a single piece of insulating sheet 187 wraps around one side of the thin outline battery 182 in a U-shape to cover both sides of the thin outline battery 182.

Insulating sheet 157 edges are inserted, and sandwiched between the thin outline battery 152 and the external case 151. Preferably the battery pack has all insulating sheet 157 perimeter edges inserted, and sandwiched between the thin outline battery 152 and the external case 151. In this type of battery pack, insulating sheet 157 is prevented from peeling off from its edges in an ideal fashion. In the battery pack of FIGS. 15 and 16, entire perimeters of two pieces of insulating sheet 157 are sandwiched between the thin outline battery 152 and the external case 151. In the battery pack of FIG. 18, the entire perimeter of a single piece of insulating sheet 187 is sandwiched between the thin outline battery 182 and the external case 181.

Figure 19:
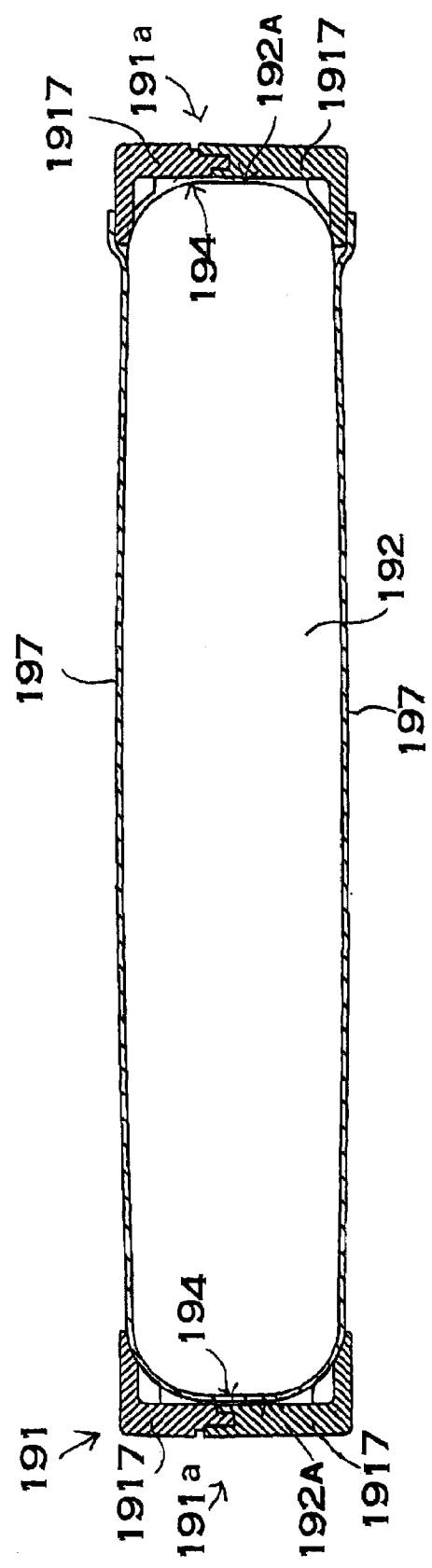
FIG. 19 is a side view in cross-section of a battery pack constructed in accordance with embodiment of the present invention.

However, for the battery pack of the present invention, it is not always necessary to insert and sandwich all insulating sheet perimeter edges between the thin outline battery and the external case. As shown in FIG. 19, some of the perimeter edges of the insulating sheet 197 can be inserted, and sandwiched between the thin outline battery 192 and the external case 191, while other perimeter edges can be attached to surfaces of the external case 191. A battery pack, which has part of the insulating sheet perimeter edge regions attached from thin outline battery surfaces to external case surfaces, can connect the external case 191 and thin outline battery 192 as a single unit via the insulating sheet 197. This has the feature that the thin outline battery 192 and external case 191 can be reliably prevented from shifting relative positions.

The external case 1, 151, formed by joining the first case section 1A, 151A and the second case section 1B, 151B, is provided with a handling clasp 18, 1518 protruding from an end region case section 1b, 151b at the bottom of the thin outline battery 2, 152. In the battery packs shown in FIGS. 3 and 17, the handling clasp 18, 1518 is established protruding from the second case section 1B, 151B. Since the second case section 1B, 151B is firmly joined to the first case section 1A, 151A by a method such as weld attachment, the region where the handling clasp 18, 1518 is established has substantial strength. As shown in FIG. 3, a cavity 19 is provided inside the end region case section 1*b* to fit a conducting lead 15 welded to the bottom of the thin outline battery 2. This structure, which fits a battery lead 15 inside the cavity 19 and which connects the thin outline battery 2 and external case 1 via insulating sheet 7 such as labels, firmly connects the external case 1 and the thin outline battery 2. Therefore this structure has the feature that the external case 1 with the handling clasp 18 and the thin outline battery 2 can be solidly joined together.

FIGS. 20 through 28 show battery packs of other embodiments of the present invention. In the following embodiments, structural elements which are the same as in previous embodiments shown in FIGS. 1 through 6, are numbered the same except for the two highest order digits, and their description is abbreviated. In the battery pack shown in FIG. 20, insulating sheet 207 covers thin outline battery 202 surfaces, and part of the periphery (upper right end in FIG. 20) of the first insulating sheet 207*a*, attached to the front side of the battery, is also attached to an end region and back side of the external case 201 in a manner straddling both the front and back of the external case 201. The upper right end of the first insulating sheet 207*a* of the battery pack shown in FIG. 20 follows the surfaces of the external case 201 and folds around an end region from the front surface to the back surface extending over, and attaching to both the front and back surfaces of the external case 201. The first insulating sheet 207*a* of the battery pack in FIG. 20 attaches to both sides of end region case section 201*b* surfaces of the external case 201 disposed opposite the bottom end 202C of the thin outline battery 202. As shown in the cross-section view of FIG. 21, the bottom end 202C of the thin outline battery 202 has a planar surface. The planar end of the bottom end 202C of the thin outline battery 202 may slide out from the opposing external case end region case section 201*b* in the direction of the arrows in FIG. 21. A configuration which attaches a first insulating sheet 207*a* straddling both sides of the external case 201 end region case section 201*b* at the bottom end 202C of the battery reliably prevents movement of the thin outline battery 202 with respect to the external case 201.

Figure 20:
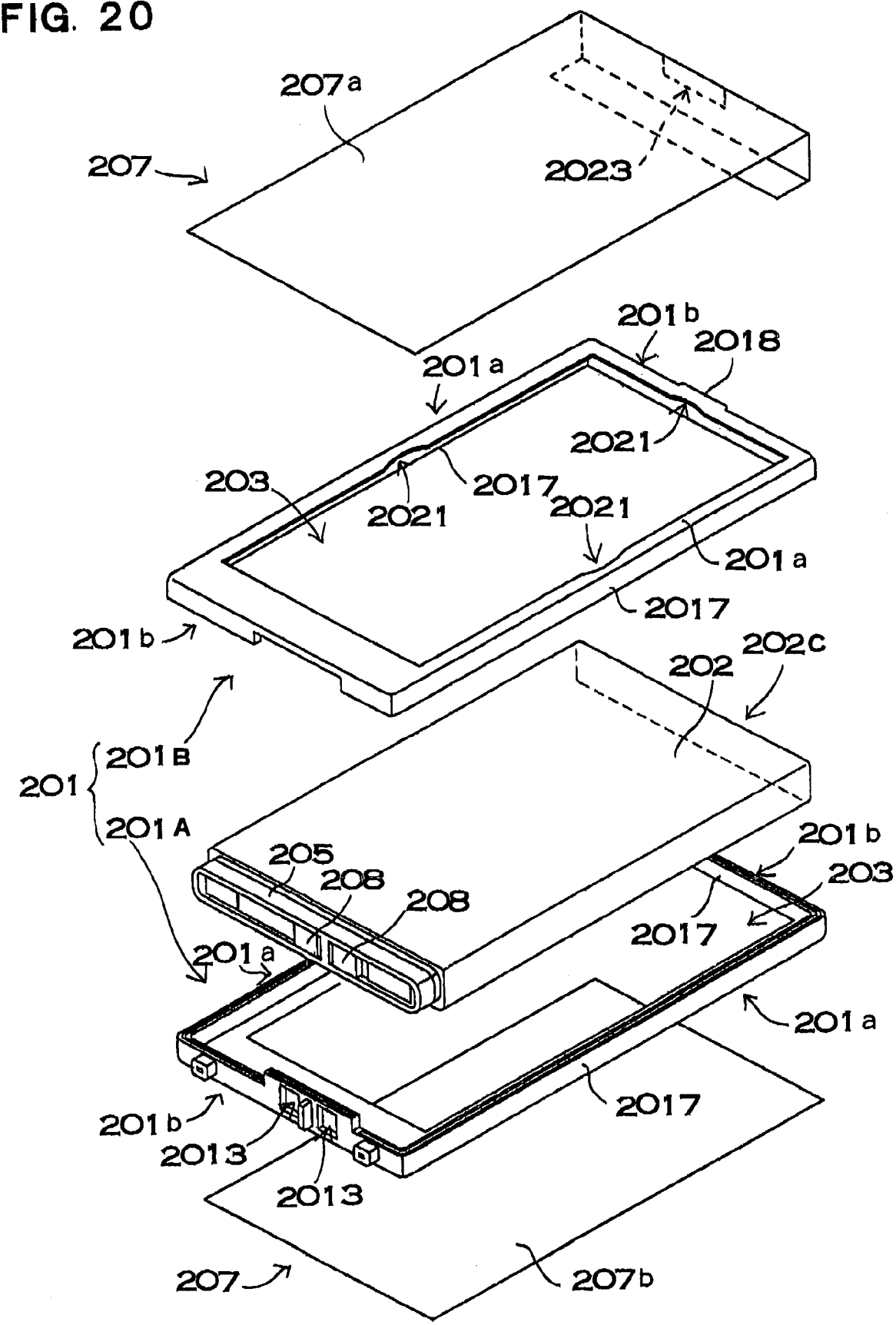
FIG. 20 is an exploded oblique view of a battery pack constructed in accordance with embodiment of the present invention.
Figure 21:
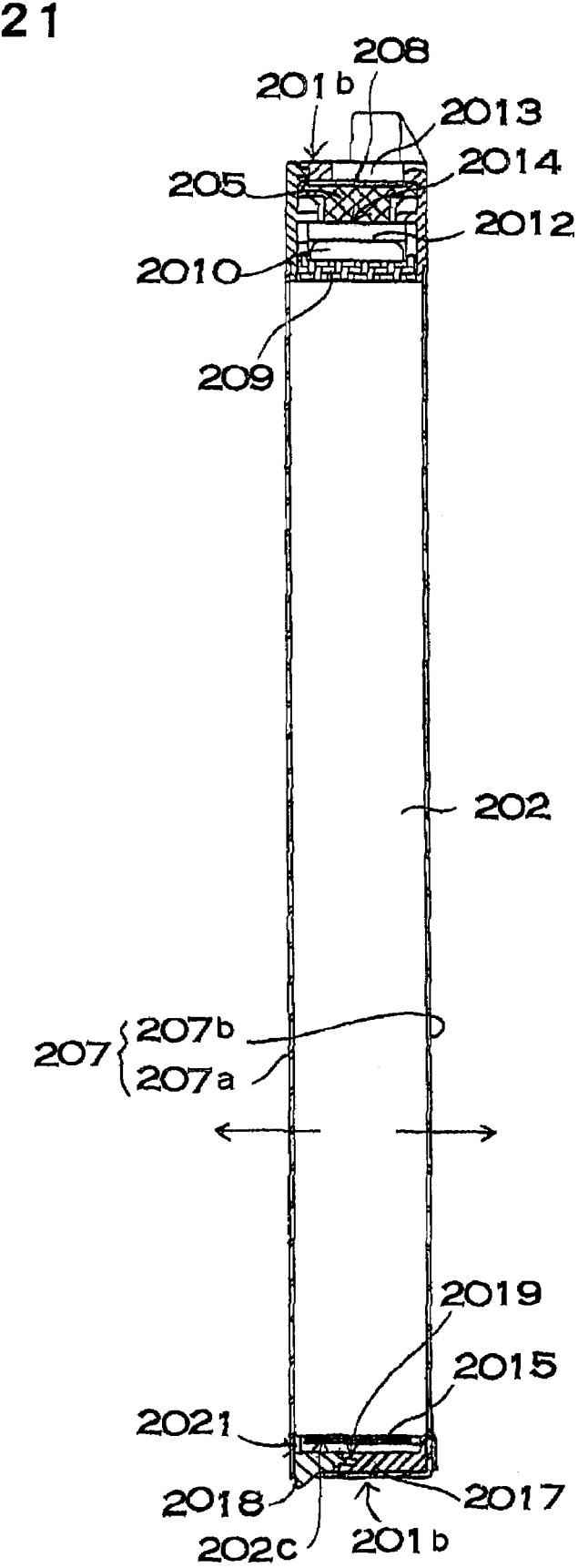
FIG. 21 is a lengthwise cross-section view of the battery pack shown in FIG. 20.
Figure 22:
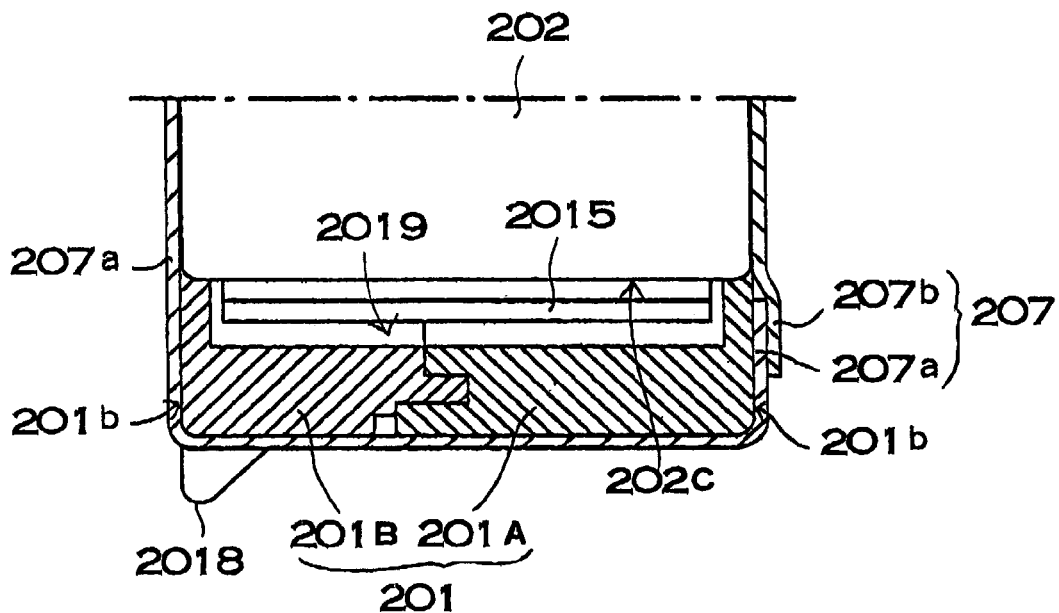
FIG. 22 is an enlarged cross-section view of pertinent parts of the battery pack shown in FIG. 21.
Figure 23:
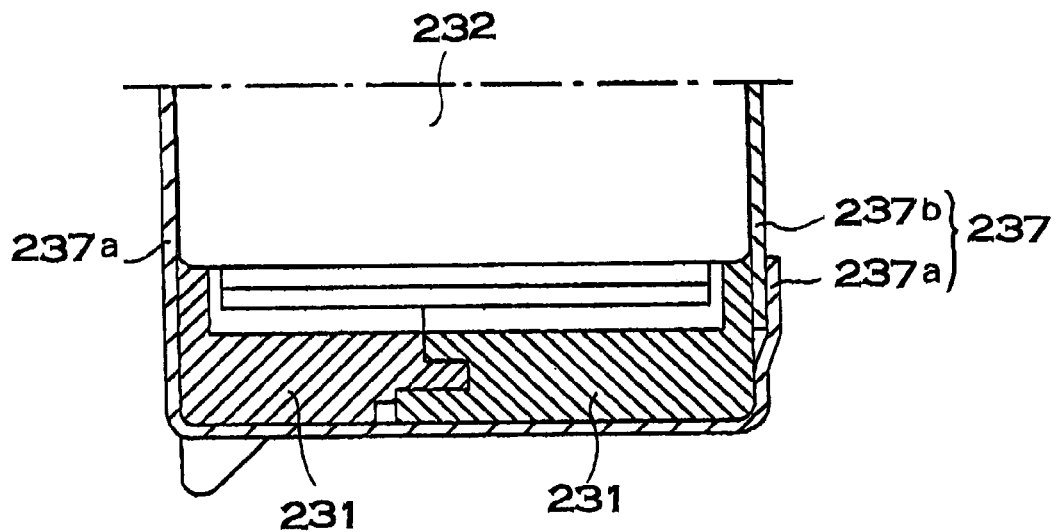
FIG. 23 is an enlarged cross-section view showing another example of insulating sheet attachment to the external case.
Figure 24:
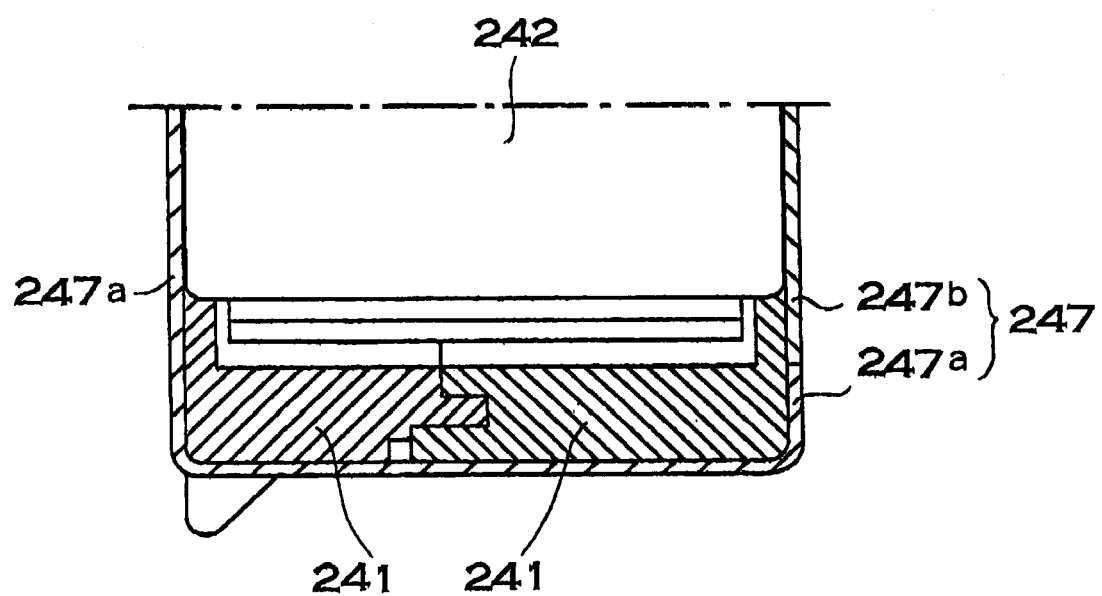
FIG. 24 is an enlarged cross-section view showing still another example of insulating sheet attachment to the external case.

In the battery pack shown in FIG. 20, which has a first insulating sheet 207*a* attached straddling both the front and back surfaces, a second insulating sheet 207*b* also is attached to the back surfaces of the thin outline battery 202 and external case 201. As shown in the cross-section view of FIGS. 21 and 22, the second insulating sheet 207*b* is attached on top of the end of the first insulating sheet 207*a*, which wraps around to the back surface. In this configuration, the second insulating sheet 207*b* can effectively prevent peeling of the edge at the end of the first insulating sheet 207*a*, and the wrap-around region in particular, due to restoration forces in the insulating sheet 207. However, as shown in FIG. 23, the wrap-around region of the first insulating sheet 237*a* may also be attached on top of the second insulating sheet 237*b*. Further, as shown in FIG. 24, the ends of the first and second insulating sheets 247*a,b* can be attached in close proximity without layering one on top of the other.

A handling clasp 2018 is provided on the external case 201 of the battery pack in FIG. 20. As shown in FIG. 20, the handling clasp 2018 is established on the external case end region case section 201*b* at the bottom end 202C of the battery. In a structure with a first insulating sheet 207*a* attached straddling the external case 201 end region, a window 2023 is provided in the first insulating sheet 207*a* to allow protrusion of the handling clasp 2018 through the first insulating sheet 207*a*. The insulating sheet 207 is attached to the external case 201 in a manner that passes the handling clasp 2018 through the window 2023. In an external case with no handling clasp, no window is provided, and the insulating sheet straddles the front and back by attaching to the front, back, and end region surfaces of the external case.

Figure 25:
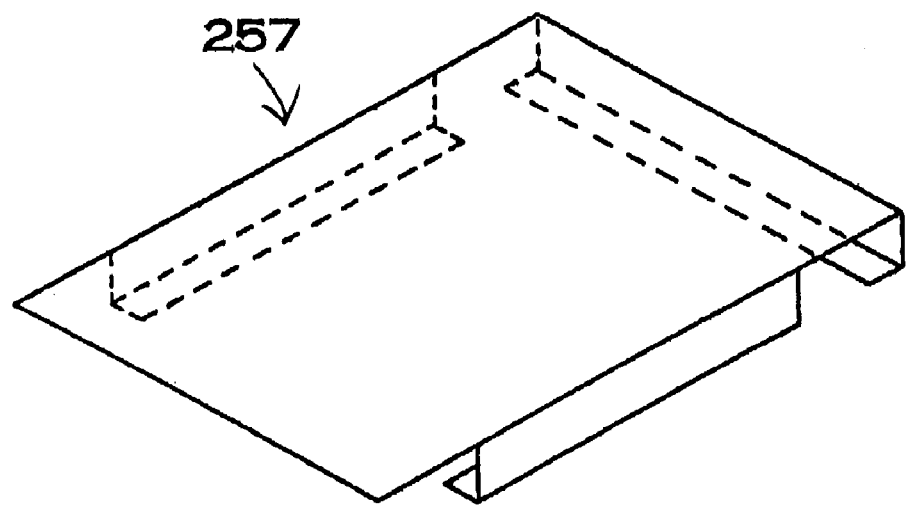
FIG. 25 is an oblique view showing another example of an insulating sheet.
Figure 26:
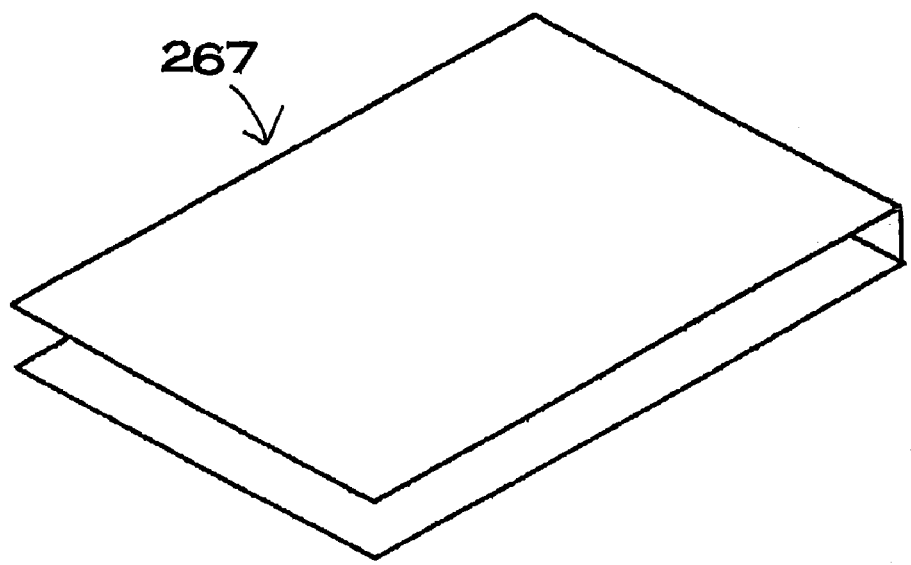
FIG. 26 is an oblique view showing still another example of an insulating sheet.

In the battery pack of FIG. 20, one periphery edge of a rectangular insulating sheet 207 is attached to both the front, back, and end surfaces of the external case 201. As shown in FIG. 25, the battery pack of the present invention may also have an insulating sheet 257 in which three sides of the periphery extend to both the front and back of the external case and the insulating sheet attaches to the front, back, side walls, and an end of the external case. Although not illustrated, the insulating sheet may also have two sides or four sides of its periphery extend to both the front and back of the external case and attach to front, back, side walls, and ends of the external case. Further, as shown in FIG. 26, a single piece of insulating sheet 267 can also be attached to extend over both the front and back surfaces.

The external case 201 of FIG. 20 is provided with adhesive bond application cavities 2021 for bonding the thin outline battery 202. Adhesive bond application cavities 2021 are provided on inside surfaces of the external case 201 in regions opposite the thin outline battery 202. In the external case 201, adhesive bond application cavities 2021 are provided in side wall case sections 201*a* positioned on both sides of the thin outline battery 202, and in the end region case section 201*b* positioned at the bottom of the thin outline battery 202. Adhesive bond supplied into the adhesive bond application cavities 2021 adheres to the periphery of the thin outline battery 202 to fix it in place in the external case 201. Adhesive bond is cyano-acrylate based instant adhesive bond, but any adhesive bond which can bond the external case 201 and the thin outline battery 202 can be used. With the thin outline battery 202 inserted in the external case 201, this instant adhesive bond is supplied into the adhesive bond application cavities 2021 to quickly bond the thin outline battery 202 in the external case 201.

Figure 27:
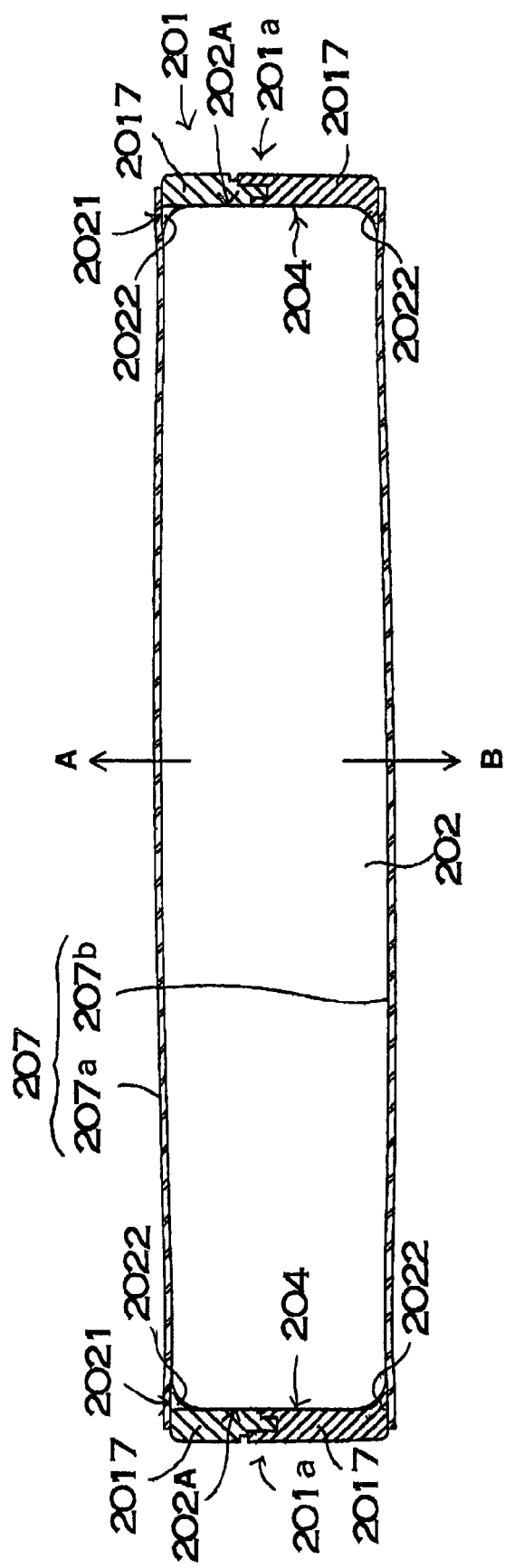
FIG. 27 is a side view in cross-section of the battery pack shown in FIG. 20.
Figure 28:
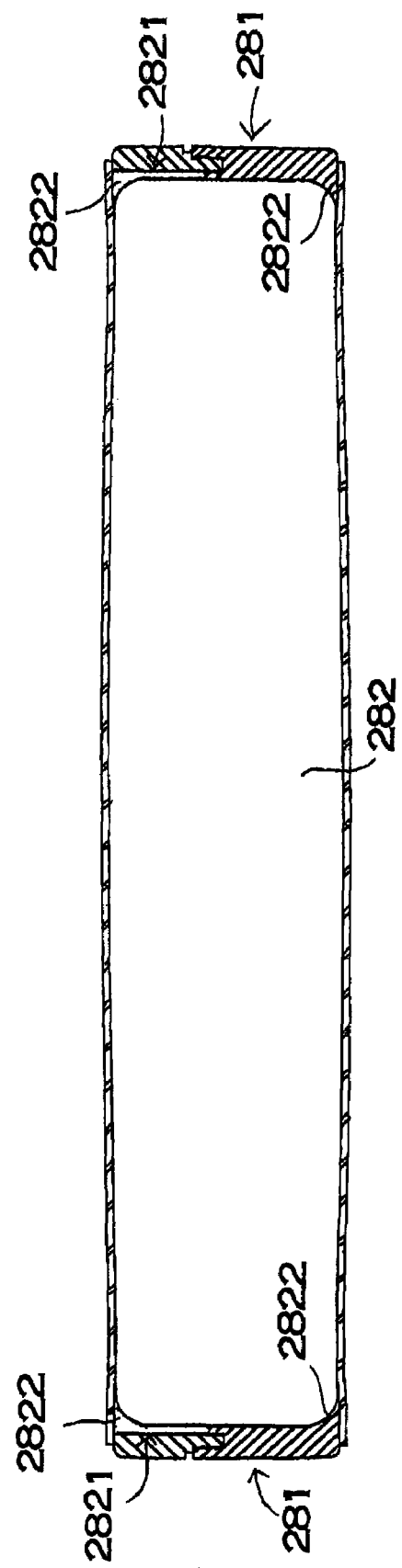
FIG. 28 is a side view in cross-section of a battery pack constructed in accordance with embodiment of the present invention.

The external case 201 shown in the cross-section side view of FIG. 27 is provided with retaining troughs 204 opposite thin outline battery 202 surfaces, and retaining ribs 222 are provided on both sides. The external case 201 of FIG. 27 is formed with part of the retaining ribs 222 removed and adhesive bond application cavities 2021 provided instead. An un-hardened low viscosity liquid adhesive bond such as a cyano-acrylate based bond is supplied into the adhesive bond application cavities 2021, which replace part of the retaining ribs 222. From there, adhesive bond seeps into gaps between the external case 201 and thin outline battery 202 to firmly bond the thin outline battery 202 to the external case 201. Adhesive bond application cavities can also extend from the retaining ribs 2822 still further into the inside surfaces of the external case 281 as shown in FIG. 28. In this case, high viscosity adhesive bond is introduced between the external case 281 and thin outline battery 282 to firmly attach the two.

Further, the external case 201 of FIG. 20 is provided with a handling clasp 2018 formed as a single piece with the external case 201 and protruding from the outside of a region provided with an adhesive bond application cavity 2021. In other words, an adhesive bond application cavity 2021 is provided inside the region provided with a handling clasp 2018. This configuration reinforces the region of the adhesive bond application cavity 2021 with the handling clasp 2018 and allows degradation of the strength of this region to be prevented.

In the battery pack of the present invention, the thin outline battery can also be bonded and fixed inside the external case without providing adhesive bond application cavities in the external case. In this configuration of battery pack, un-hardened adhesive bond is applied to the outer periphery surfaces of the thin outline battery and the inner periphery surfaces of the external case, and subsequently the thin outline battery is inserted into the case to bond the two.

As shown in the cross-section view of FIG. 27, both side walls of the thin outline battery 202 have central protruding regions 2024. A configuration, in which central protruding regions 2024 on both sides of the thin outline battery 202 insert into retaining troughs 204 provided on the inside surfaces of the external case 201, has the effect of holding the thin outline battery 202 in the external case 201 without its position slipping. Thin outline batteries 202 with small protruding regions such as rectangular batteries can be reliably fixed inside the external case 201 by bonding side surfaces of the thin outline battery 202 to inner surfaces of the external case 201.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A battery pack comprising:
   an external case; and
   a thin outline battery held in the external case, the battery having a thickness that is smaller than its width;
   wherein the external case is provided with openings which expose a front surface and a back surface of the thin outline battery to the outside, the external case is formed in the shape of a rectangular frame which covers both sides and both ends of the thin outline, and the thickness of the external case is substantially equal to the thickness of the thin outline battery or the external case is thinner than the thin outline battery,
   wherein the external case comprises a first case section and a second case section divided between the front and back surfaces of the thin outline battery, each of the first case section and the second case section comprising side wall case sections and end region case sections, respectively, such that the first case section and the second case section hold the thin outline battery by connecting side wall case sections and end region case sections, respectively, and
   wherein the thin outline battery has first curved surfaces at both side walls, the first curved surfaces of the side walls defining rounded corner edges and central protruding regions, the side wall case sections have second curved surfaces which at least partially complement the first curved surfaces, the edges of the side wall case sections being positioned at the rounded corner edges of the thin outline battery to mate the edges of the side wall case sections with the rounded corner edges of the thin outline battery by contacting the first curved surfaces of the side walls with the second curved surfaces of the side wall case sections such that the external case holds both sides of the thin outline battery with the side wall case sections thereby preventing the thin outline battery from falling out in the front or back directions of the thin outline battery.

2. A battery pack as recited in claim 1, wherein the side wall case sections cover both sides of the thin outline battery and the end region case sections cover both ends of the thin outline battery, and wherein inside surfaces of the side wall case sections are provided with retaining troughs and central protruding regions on both sides of the thin outline battery are inserted into these retaining troughs.

3. A battery pack as recited in claim 1, wherein the thin outline battery is adhesively bonded and fixed to inside surfaces of the external case.

4. A battery pack as recited in claim 3, wherein adhesive bond application cavities are provided on the inside surfaces of the external case in regions opposite the thin outline battery, and an adhesive bond supplied into the adhesive bond application cavities adheres the thin outline battery to the external case.

5. A battery pack as recited in claim 4, wherein the external case forms a handling clasp integrally protruding from an area located outside of a region provided with one of the adhesive bond application cavities.

6. A battery pack as recited in claim 1 wherein a terminal holder for output terminals is disposed in one of the end region case sections or one of the side wall case sections of the external case.

7. A battery pack as recited in claim 1, wherein the first case section and the second case section are joined by weld attachment.

8. A battery pack as recited in claim 1, wherein the thin outline battery and the external case are covered by an insulating sheet.

9. A battery pack as recited in claim 1, wherein one part of a peripheral edge of an insulating sheet is attached such that it straddles both the front and back surfaces of the external case.

10. A battery pack as recited in claim 8, wherein attachment surfaces of the thin outline battery and the external case to which the insulating sheet is attached have non-planar regions; and the insulating sheet is formed to fit along these non-planar regions and is attached to attachment surfaces of the thin outline battery and the external case.

11. A battery pack as recited in claim 10, wherein the insulating sheet is surface treated to keep non-planar shapes formed along the non-planar regions from standing out.

12. A battery pack as recited in claim 1, wherein surfaces of the thin outline battery are covered by an insulating sheet, edge regions of the insulating sheet are disposed between the thin outline battery and the external case, and the insulating sheet edge regions are sandwiched between the thin outline battery and the external case.

13. A battery pack as recited in claim 12, wherein the thin outline battery has a cap region, and the insulating sheet is disposed over the thin outline battery cap region, and the thin outline battery cap region is insulated by the insulating sheet.

14. A battery pack as recited in claim 12, wherein all perimeter edges of the insulating sheet are inserted, and sandwiched between the thin outline battery and the external case.

15. A battery pack as recited in claim 12, wherein the insulating sheet includes two pieces of insulating sheet, and the front and back surfaces of the thin outline battery are covered by the two pieces of insulating sheet.

16. A battery pack as recited in claim 12, wherein the insulating sheet comprises a single piece of insulating sheet, and the front and back surfaces of the thin outline battery are covered by the single piece of insulating sheet which is wrapped around the thin outline battery in a U-shape.

17. A battery pack as recited in claim 1, wherein a compartment to hold protection circuitry is provided in one of the end region case sections or one of the side wall case sections which houses the output terminals, and protection circuitry is installed in the compartment and insulated from the outside.

18. A battery pack as recited in claim 1, wherein a terminal holder, which disposes output terminals in fixed positions, contains protection circuitry, and the terminal holder is housed in one of the end region case sections or one of the side wall case sections of the external case.

19. A battery pack as recited in claim 1, wherein an insulating ring is disposed at an end plane of the thin outline battery that is provided with a protruding electrode, the insulating ring has a through hole, and the protruding electrode is inserted into the through hole to insulate the battery end plane.

* * * * *